R. W. AND W. V. BEAL.
GRADING APPARATUS.
APPLICATION FILED AUG. 21, 1922.

1,437,884.

Patented Dec. 5, 1922.
2 SHEETS—SHEET 1.

Inventors:
R. W. Beal.
W. V. Beal.

By [signature]
Attorney.

R. W. AND W. V. BEAL.
GRADING APPARATUS.
APPLICATION FILED AUG. 21, 1922.

1,437,884.

Patented Dec. 5, 1922.
2 SHEETS—SHEET 2.

Inventors:
R. W. Beal.
W. V. Beal.

By
Attorney.

Patented Dec. 5, 1922.

1,437,884

UNITED STATES PATENT OFFICE.

RALPH W. BEAL AND WARREN V. BEAL, OF ALLIANCE, NEBRASKA.

GRADING APPARATUS.

Application filed August 21, 1922. Serial No. 583,183.

*To all whom it may concern:*

Be it known that we, RALPH W. BEAL and WARREN V. BEAL, citizens of the United States, residing at Alliance, in the county of Box Butte and State of Nebraska, have invented certain new and useful Improvements in Grading Apparatus, of which the following is a specification.

This invention relates to apparatus for grading or sorting potatoes and other products according to size and quality, and its object is to provide an apparatus of this kind embodying certain novel and improved features of construction and modes of operation as will be pointed out in the detailed description appearing hereinafter, and also to provide a grading or sorting apparatus which is simple and inexpensive in structure, and rapid and efficient in operation.

In order that the invention may be better understood, reference is had to the accompanying drawings, wherein—

Figure 1:
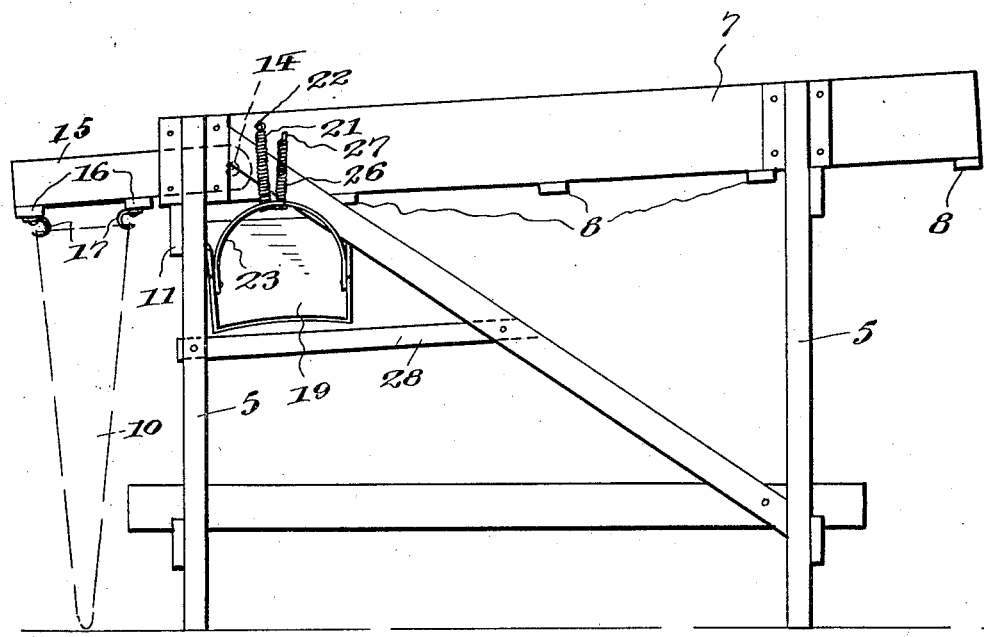
Figure 3:
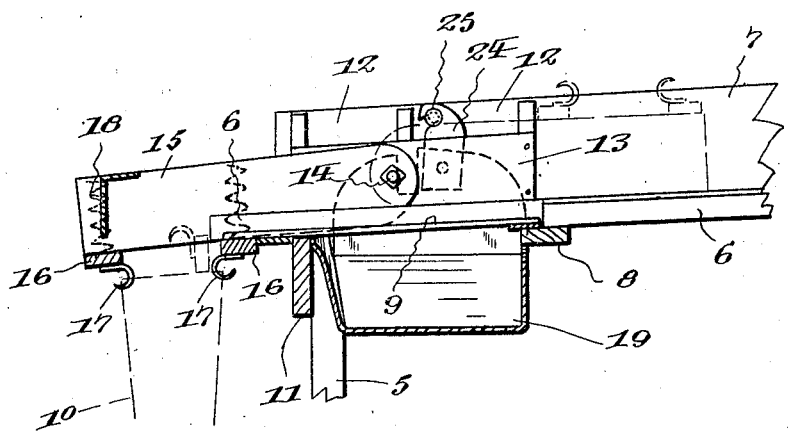
Figure 2:
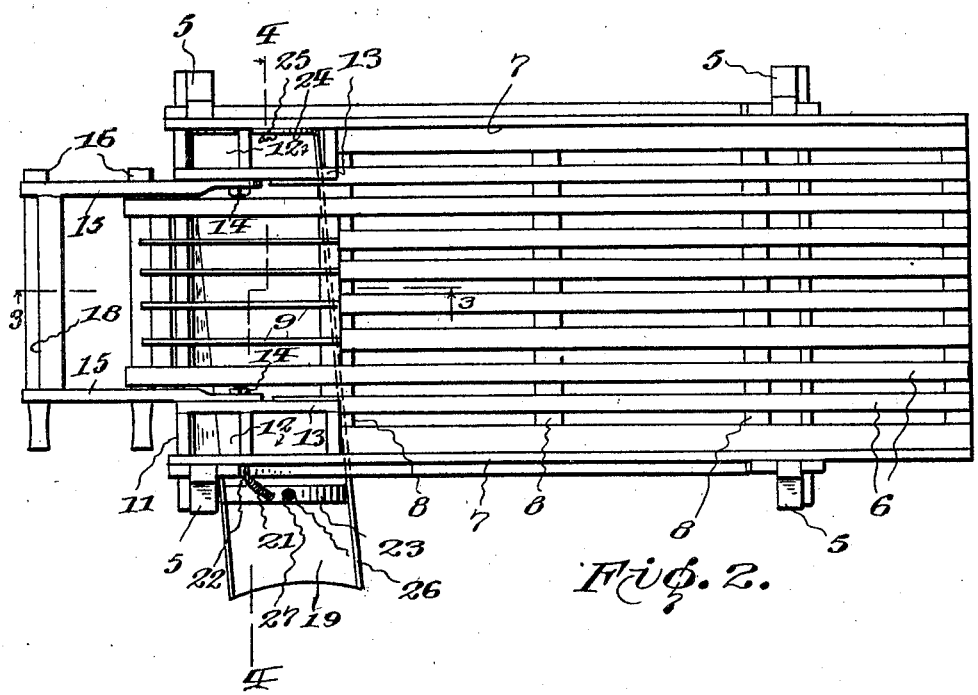
Figure 4:
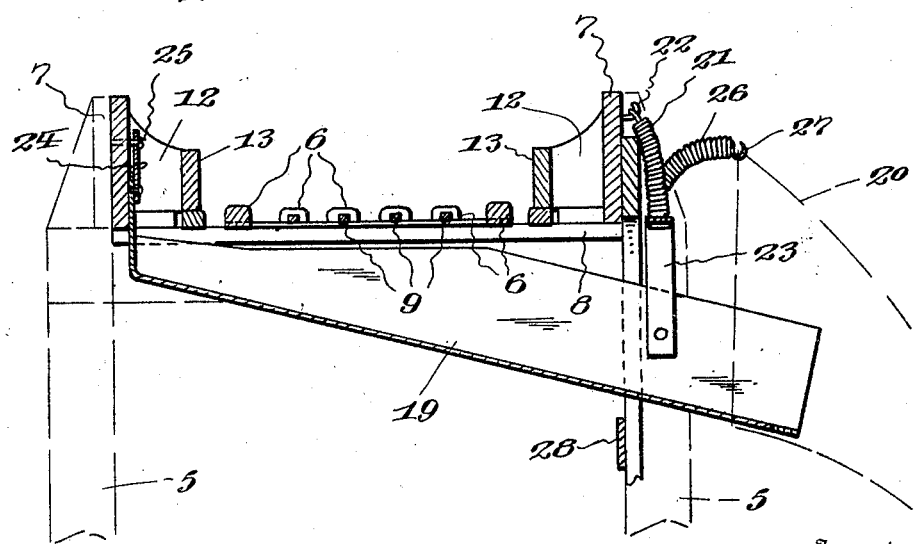

Figure 1 is a side elevation of the apparatus; Fig. 2 is a plan view thereof; Fig. 3 is a longitudinal section on the line 3—3 of Fig. 2, and Fig. 4 is a cross-section on the line 4—4 of Fig. 2.

Referring specifically to the drawings, the apparatus consists, essentially, of a feed table having legs 5 and an inclined top composed of parallel and laterally spaced slats 6 extending in the direction of the length of the table and forming a grating or screen. At the sides of the grating are upright boards 7 which serve to prevent escape of the potatoes over the sides of the grating. These boards carry cross bars 8 on which the slats 6 are mounted and secured. The table legs are suitably braced as shown in Fig. 1.

At the lower end of the grating 6 hereinbefore described is a sorting grid which is composed of parallel rods 9 spaced from each other a distance to allow all potatoes of a certain size to drop therebetween, the larger potatoes remaining on the grid and passing down the same to drop into the bag 10 shown dotted in Fig. 1. The grid rods are removably supported by one of the cross bars 8 and by a cross bar 11 connecting the legs 5 at the lower end of the table.

The grid 9 does not extend throughout the entire width of the table, so that there is left room enough on each side for a pair of downwardly extending chutes 12 which are built on the side boards 7.

To the inner walls 13 of the chutes 12 are hinged, as shown at 14, a pair of longitudinal bars 15 which form the supporting frame of a holder for the bag 10. These bars project from the lower or discharge end of the grid 9, and the projecting ends carry crossbars 16 equipped with bag-holding hooks 17. The bag-holder is the same as the one disclosed in Patent No. 1,422,524, dated July 11, 1922, the cross-bars 16 being spring-supported. Two of the slats 6 are continued alongside the grid 9 and extended for a short distance beyond the lower end thereof, and the rear one of the cross-bars 16 seats normally beneath the projecting ends of said slats. Upon swinging the aforesaid cross-bar forwardly to clear the projecting ends of the slats, as shown by dotted lines in Fig. 3, the bag-holder can be swung back as shown by dotted lines in Fig. 3 to lie close to the top of the table, between the side boards 7 thereof. This arrangement reduces the compass of the apparatus, and facilitates shipment and storage. The outer ends of the bars 15 are connected by a cross-bar 18 which prevents the potatoes from going too far forwardly and missing the bag 10.

Beneath the sorting grid 9 and the chutes 12 is mounted a trough 19 which extends transversely of the table so as to discharge at one side thereof. This trough is inclined, and at its lower end is mounted a bag, as shown dotted at 20 in Fig. 4. The lower or discharge end of the trough is suspended by a coiled spring 21 attached at one end to a hook 22 on one of the side boards 7, and connected at its other end to a bail 23 on the trough. The other end of the trough is fitted with a hook 24 which is slipped over a screw or similar fastener 25 on one of the side boards 7 inside one of the adjacent chutes 12. The end wall of the trough extends into both chutes and it is slotted to clear the dividing wall therebetween as shown in Fig. 3. The hereinbefore described connection of the trough with the side board is sufficiently loose to permit the trough to drop slightly as the potatoes drop thereinto, and as its other end is spring-suspended the trough has an up-and-down vibratory motion when in use, whereby the potatoes are kept agitated and traveling down the same to the bag 20, clogging of the trough being thus effectually prevented.

The mouth of the bag 20 is slipped over the lower end of the trough 19 as shown in Fig. 3, and it is so held by a coiled spring 26 anchored at one end to the bail 23 and having at its other end a hook 27 engageable with the bag. The downward motion of the trough 19 is limited by a cross bar 28 carried by the table.

In operation, the potatoes are deposited on the screen or grating 6, and due to the inclination thereof they travel in the direction of the grid 9. In the travel of the potatoes down the screen all dirt, etc., is discharged through the screen. Upon reaching the grid, the potatoes which are too large to pass between the grid rods go to the bag 10, and the potatoes which are small enough to pass between the grid rods drop down onto the trough 19 and pass to the bag 20. There will also be stationed on each side of the table an operator to see that imperfect potatoes which are too large to pass between the grid rods shall not get into the bag 10. Such potatoes will be thrown by the operators into the chutes 12, which latter guide them to the trough 19 for delivery into the bag 20 with the small potatoes. It will be understood, of course, that instead of the bags 10 and 20, any other suitable receptacles may be used for receiving the assorted potatoes. The apparatus is also not limited to the assorting or grading of potatoes, but it can, with equal facility, be used for grading or sorting other vegetables, as well as fruits, etc.

As the operators stand directly back of the chutes 12, the throwing out of imperfect stock is readily effected, it being unnecessary for the operators either to look around to locate a receptacle into which to throw the sorted stock, or to make any elaborate movement of the arms to throw the stock into the receptacle. The inclination of the table is such that the potatoes or other stock will move along to the sorting grid at the proper rate of speed. If a greater speed is required, it can be readily obtained by raising the receiving end of the table, whereas if less speed is required it is necessary only to raise the discharge end of the table. The size of the stock going to the trough 19 can be varied by changing the grid 9 for one having a different spacing of its rods.

We claim—

1. A grading apparatus comprising a feed table having a grading grid at its discharge end, a receptacle-holding means at the discharge end of the grid, a trough positioned transversely beneath the grid, and chutes at the sides of and outside the grid, said chutes leading to the trough.

2. A grading apparatus comprising a feed table having a grading grid at its discharge end, a receptacle-holding means at the discharge end of the grid, a trough positioned transversely beneath the grid, means for supporting the trough to permit a vibratory motion thereof, and chutes at the sides of and outside the grid, said chutes leading to the trough.

3. A grading apparatus comprising a feed table having a grading grid at its discharge end, a receptacle-holding means at the discharge end of the grid, a trough positioned transversely beneath the grid, said trough being loosely supported at one end to permit a vibratory motion, a spring suspension for the other end of the trough, and chutes at the sides of the grid leading to the trough.

4. A grading apparatus comprising a feed table having a grading grid at its discharge end, a receptacle-holding means pivotally supported at the discharge end of the grid for folding back on top of the feed table, a trough positioned transversely beneath the grid, and chutes at the sides of the grid leading to the trough.

In testimony whereof we affix our signatures.

RALPH W. BEAL.
WARREN V. BEAL.